United States Patent [19]

Hartwig

[11] 4,409,525

[45] Oct. 11, 1983

[54] VEHICLE

[75] Inventor: Carl S. M. Hartwig, Täby, Sweden

[73] Assignee: Atlas Copco Aktiebolag, Nacka, Sweden

[21] Appl. No.: 283,517

[22] Filed: Jul. 15, 1981

[30] Foreign Application Priority Data

Aug. 14, 1980 [SE] Sweden .............................. 8005729

[51] Int. Cl.³ .............................................. H02J 7/00
[52] U.S. Cl. .................................... 318/139; 318/377; 320/56
[58] Field of Search ................ 318/139, 140, 151–154, 318/759–762, 376–378, 382, 302; 320/56

[56] References Cited

U.S. PATENT DOCUMENTS 3,586,954  11/1968  Carves ................................... 320/56
4,292,578   9/1981  Steigerwald et al. .............. 318/139
4,330,742   5/1982  Reimers ............................. 318/139

FOREIGN PATENT DOCUMENTS 1788152 of 0000 Fed. Rep. of Germany .
351333 of 0000 Sweden .
WO79/01127 of 0000 PCT Int'l Appl. .

Primary Examiner—J. V. Truhe
Assistant Examiner—Arthur G. Evans
Attorney, Agent, or Firm—Frishauf, Holtz, Goodman & Woodward

[57] ABSTRACT

A battery operated vehicle having a charging device for charging the battery from an external source of power, said device being integrated with the electrical system of the traction motor. The speed of said traction motor is controlled by a chopper-controller having an operation mode in which said motor is used for regenerative braking. The charging device comprises said chopper-controller which is arranged to be operated in said regenerative braking mode and switched in between the power source and the battery when said battery is charged.

4 Claims, 4 Drawing Figures

VEHICLE

BACKGROUND OF THE INVENTION

The present invention relates to a vehicle operated by electric battery power comprising an electric traction motor, a chopper-controller for controlling the motor speed and a battery chargeable from a power source separate from the vehicle. The invention also relates to a device for charging the battery of such a vehicle.

Electric battery powered vehicles have normally to be charged regularly from a power source separate from the vehicle. This can be done either by parking the vehicle and charging the battery while it remains in the vehicle or by changing the battery for another fully charged battery. For heavy battery powered vehicles, i.e. loading vehicles, the battery capacity will usually not last for a full work shift which means that the vehicle or the battery must be exchanged before the end of the shift. This causes problems with working interruptions for changing the battery or also the economic disadvantage of having two vehicles instead of one.

One solution to that problem could be to provide the vehicle with a charging device located in the vehicle so as to enable charging of the battery also during short working interruptions, lunch breaks etc. In that way the operation time of the battery could be substantially prolonged without having undesirable breaks during the operation of the vehicle.

The object of this invention is thus to provide a battery operated vehicle which has a charging device integrated with the electrical system of the vehicle and especially to provide a vehicle of the above kind whose traction motor speed is controlled by a chopper-controller adapted in such a way as to make it possible to use it also for controlling the supply of charging energy to the battery. This purpose and others are achieved by providing a vehicle according to the accompanying claims.

The invention will now be further described in connection with the enclosed drawings.

DETAILED DESCRIPTION

Figure 1:
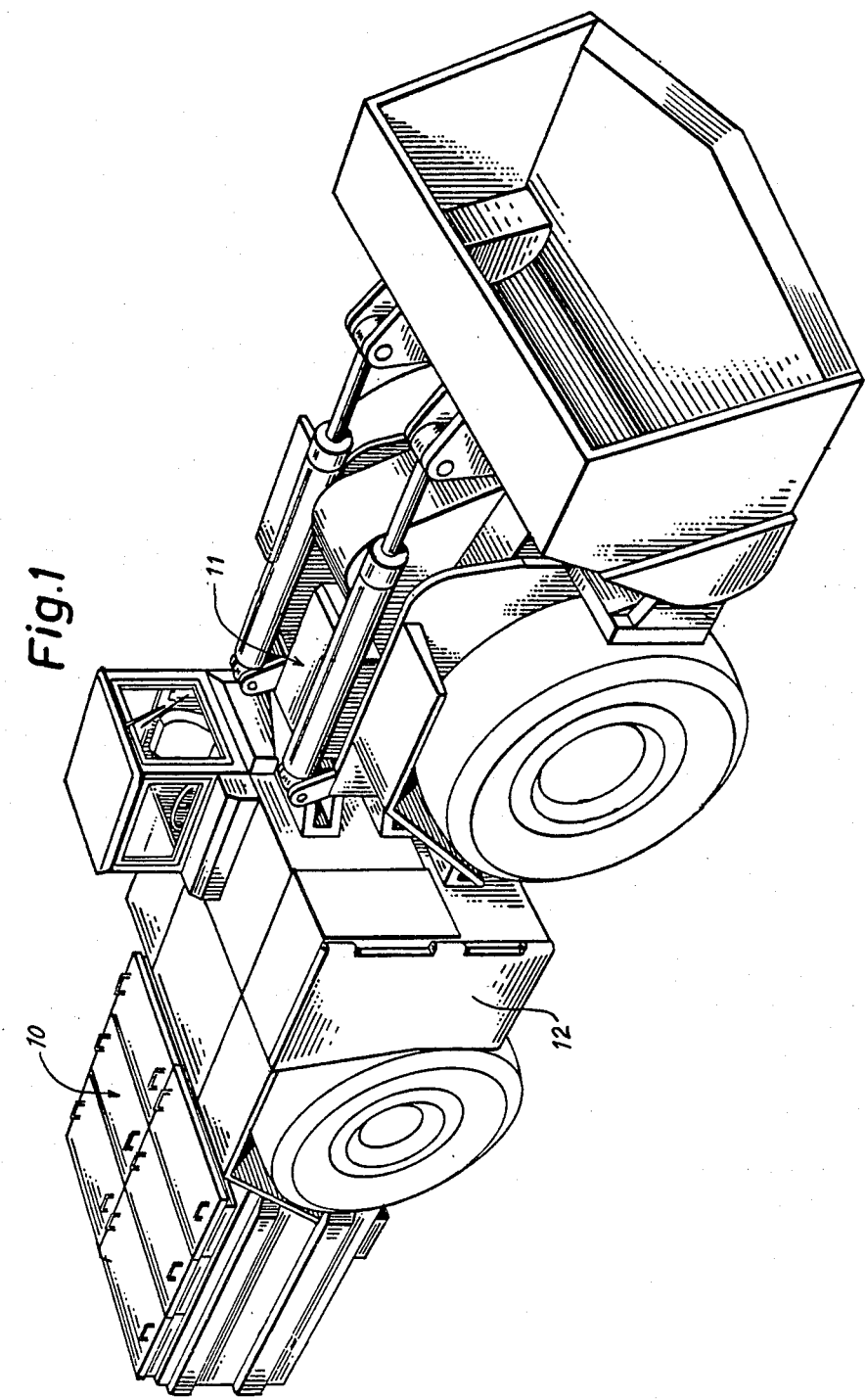
FIG. 1 shows a loading vehicle according to the invention.

The loading vehicle according to FIG. 1 is operated by electric battery power and comprises a battery box 10, an electric traction motor 11 and a control box 12. Said control box 12 contains the electrical equipment for controlling the driving and braking systems of the vehicle as well as additional part necessary when charging the battery 10. The traction motor is a DC series motor which is connected to the front and rear axles by not shown driving shafts.

Figure 2:
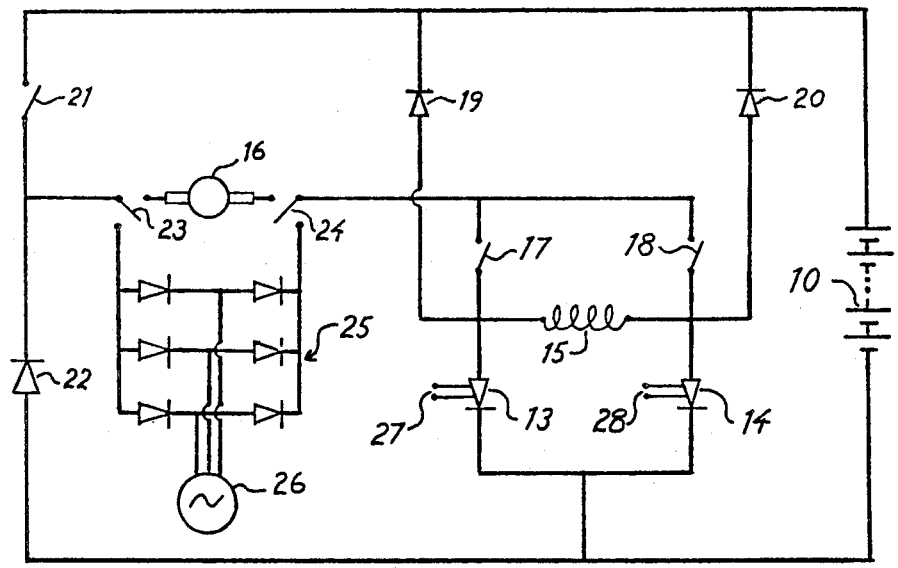
FIG. 2 is a schematic diagram over the electrical circuit of the traction motor and the charging device in such a vehicle.

The electrical circuit according to FIG. 2 includes a chopper-controller for controlling the speed of the motor and for enabling regenerative braking. The main part of the chopper-controller is two forced-commutated thyristors 13 and 14 connected on each side of the field winding 15 of the motor 11. The first thyristor 13 is in use when driving forwards while the second one is activated when the vehicle is reversed. The driving direction is determined by the rotation direction of the motor 11 which in turn is determined by the current direction in the field winding 15. To control this current direction there are two contactors 17 and 18 parallelly disposed between the armature rotor 16 of the motor 11 and each side of the field winding 15 respectively. Diodes 19 and 20 are connected to each side of the field winding 15. They are included in free-wheel circuits also comprising the armature 16 and the field winding 15. In the diagram there are also a contactor 21 and a diode 22 which are necessary when the electric system is arranged in the mode of regenerative braking or battery charging. On each side of the armature 16 there is a contactor 23 and 24 respectively which form a change-over switch for disconnecting the armature 16 and in its place switch in an uncontrolled rectifier 25 when the battery 10 is to be charged from the line 26 or any other external power source.

When driving forwards the contactors 21 and 18 are closed. The thyristor 13 is triggered by a schematically shown trigger circuit 27 and an increasing current will flow through the armature 16 and the field winding 15. When the thyristor 13 is turned off a decreasing current will flow through a circuit consisting of the free-wheel diode 19, the contactor 21, the armature 16, the contactor 18 and the field winding 15. When the current has decreased to a chosen level the thyristor 13 is triggered again and then the above process will be repeated continuously. The thyristor 13 will together with the free-wheel circuit generate a triangular shaped motor current. The motor speed is controlled by an electronic control of the trigger pulses in the trigger circuit 27 and in such a way as the thyristor 13 is triggered in proportion to the depression of the foot throttle.

To drive backwards the current direction must be reversed in the field winding 15. This is done by opening the contactor 18 and closing the contactor 17. The thyristor 14 is now used for generating the triangular shaped current. When the thyristor 14 is triggered by another schematically shown trigger circuit 28 the current will flow in the circuit with the battery 10, the armature 16, the field winding 15 and the thyrisor 14 and during the periods when the thyristor 14 is turned off the current flows in the circuit with the field winding 15, the free-wheel diode 20 and the armature 16.

During regenerative braking the contactor 21 is opened and if the vehicle drives forwards the contactor 18 is open while the contactor 17 is in the closed position. The magnetic flux in the motor is reversed by an external not shown circuit and a motor voltage is built up with the higher potential in the field winding 15. When the thyristor 14 is triggered an increasing current will flow through the diode 22, the armature 16 and the field winding 15 building up an increasing electro-magnetic flux in the field winding 15. When the current has reached a chosen level the thyristor 14 is turned off and the field winding 15 is discharged through the diode 20, the battery 10, the diode 22 and the armature 16. Thus the battery 10 is periodically supplied with charging current from the energy stored in the field winding 15. During the same periods the battery 10 is also charged directly from the armature 16 and this direct part is increased when the motor speed raises. The applied braking force and the total charging current intensity is determined by the conduction duty cycle of the thyristor 14.

If the brake is used when the vehicle drives backwards instead, the contactor 18 is closed and the contactor 17 is opened. When the thyristor 13 is triggered a current will now flow in the circuit including the diode 22, the armature 16 and the field winding 15 and when said thyristor 13 is turned off a charging current will flow through the battery 10 via the diodes 19 and 22. Otherwise the braking action will be carried out in the same way as when driving forwards.

The electric system of the traction motor is as already been mentioned adapted in such a way as to make it possible to recharge the battery 10 from a power source separated from the vehicle. When the recharge is to be done, the armature 16 is disconnected by the contactors 23 and 24 and instead the rectifier 25 is switched in. Said rectifier 25 is arranged as a diode-bridge including six diodes and can be connected to the three-phase line 26 in a known way. Then the chopper is arranged in the mode of regenerative braking as when driving forwards or backwards. In the forward position the contactor 17 is closed while the contactors 18 and 21 are opened. When the thyristor 14 is triggered an increasing current will flow through the field winding 15 and an electromagnetic flux is built up and when the thyristor 14 is turned off a decreasing current flows through the diode 20, the battery 10, the diode 22 and the rectifier 25 thus charging the battery 10. In a similar way as by regenerative braking a part of the charging current delivered to the battery 10 comes directly from the rectifier 25 during the periods when the thyristor 14 is turned off, the total charging current intensity being directed by the electronic control of the trigger circuit 28. Preferably this can be done by keeping the current under a chosen level. A separate controller for the charging current will thus not be necessary.

Figure 3:
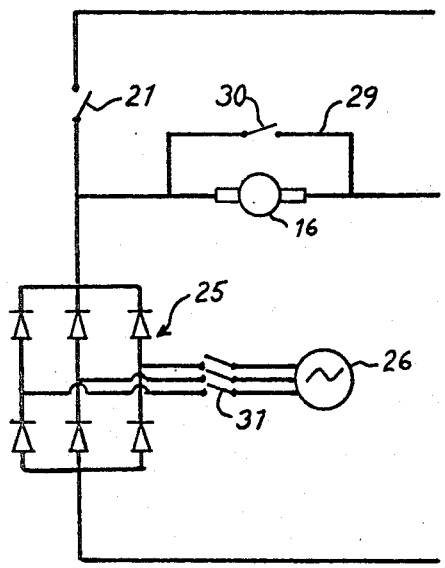
FIG. 3 is a part of an alternative embodiment of the diagram according to FIG. 2.

As seen in FIG. 3 the embodiment according to FIG. 2 can be slightly simplified. Here the diode-bridge 25 replaces the diode 22 and serves as a braking-diode when the external three-phase line 26 is not connected. The armature 16 can be disconnected by a short-circuiting parallel line 29. The line 29 has a contactor 30 which is closed when the battery is to be charged from the external main line 26 which in turn is connectable by another contactor 31. The other not shown right part of the diagram is equal to the corresponding right part in FIG. 2 and the function will be the same as been previously described in connection to FIG. 2.

Figure 4:
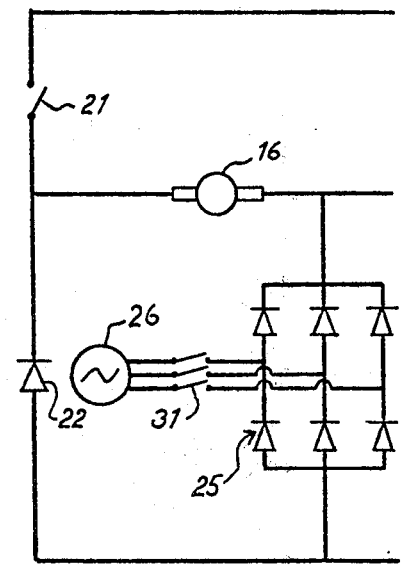
FIG. 4 is still another embodiment according to FIGS. 2 and 3.

Another example of the arrangement of the diode-bridge 25 is shown in FIG. 4 which is a corresponding part of the diagram shown in FIG. 3. Here the diode-bridge 25 is constantly connected in parallel with the diode 22 and the armature 16. By this arrangement the contactors 23 and 24 in FIG. 2 or the contactor in FIG. 3 could be eliminated. In principle the function will be the same as in the previous examples, so when charging the battery 10 from the external line 26 the contactor 17 is closed while the contactors 18 and 21 are opened. When the thyristor 14 is triggered an increasing current will flow through the circuit including said thyristor 14, the diode-bridge 25 and the field winding 15. An electro-magnetic flux is built up in the field winding 15 and when the thyristor 14 is turned off a charging current through the battery 10 via the field winding 15, the diode 20 and the diode-bridge 25 is obtained. The function is similar to regenerative braking operation.

It is to be understood that the described vehicle is only an example of the invention and that the invention may be varied in many ways within the scope of the claims.

I claim:

1. A vehicle operated by electric battery power comprising:
   a DC electric traction motor (11) having an armature (16) and a field winding (15);
   a battery (10) chargeable from an external power source (26) separate from the vehicle; and
   a battery charging and motor drive controlling circuit comprising:
   a chopper-controller being operable in a drive mode for coupling said motor to said battery (10) for controlling the motor speed and for selectively operating in an external charge mode for coupling said battery (10) to said external power source (26) for controlling the supply of battery charging energy to said battery (10) from said external source (26);
   said chopper-controller being also operable in a regenerative braking mode and includes means coupled to said field winding (15) of said motor for causing said motor to carry out regenerative braking of the vehicle when in said regenerative braking mode;
   said chopper-controller including replacing means coupled to said armature (16) and to said external power source (26) for replacing said armature (16) with said external power source (26) when in said external charge mode;
   a diode-bridge rectifier means (25) coupling said external power source (26) to said replacing means;
   said chopper-controller operating in said regenerative braking mode when said battery (10) is charged from said external source (26); and
   said chopper-controller further comprising a first circuit including a series circuit of a forced-commutated thyristor (14), a first diode means (22) and the traction motor (11); whereby when said copper-controller is in said regenerative braking mode, said first circuit builds up charging energy in said field winding (15) of the motor (11) which energy is supplied to said battery (10) by said second circuit for charging said battery (10) during said regenerative braking mode.

2. The vehicle of claim 1, wherein said first diode means (22) comprises said diode-bridge rectifier means (25); and wherein said replacing means includes means (29,30) for short-circuiting said armature (16) when said battery (10) is to be charged from said external power source (26) during said operation in said external charge mode.

3. The vehicle of claim 1, wherein said diode-bridge rectifier means is coupled in parallel with said armature (16) and said first diode means (22).

4. The vehicle of claim 1, wherein said replacing means includes a change-over switch means arranged to disconnect said armature (16) and to shut in, in its place, said diode-bridge rectifier means (25) when said battery (10) is to be charged from said external power source (26) during operation in said external charge mode.

* * * * *